(12) United States Patent
Nishizaka

(10) Patent No.: US 10,044,392 B2
(45) Date of Patent: Aug. 7, 2018

(54) ELECTRONIC DEVICE

(71) Applicant: KYOCERA Corporation, Kyoto (JP)

(72) Inventor: Naoki Nishizaka, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/465,703

(22) Filed: Mar. 22, 2017

(65) Prior Publication Data

US 2017/0279475 A1   Sep. 28, 2017

(30) Foreign Application Priority Data

Mar. 24, 2016 (JP) .................................. 2016-060472

(51) Int. Cl.
| | | |
|---|---|---|
| *H04M 1/00* | (2006.01) | |
| *H04B 1/3827* | (2015.01) | |
| *H01Q 1/27* | (2006.01) | |

(52) U.S. Cl.
CPC ........... *H04B 1/3838* (2013.01); *H01Q 1/273* (2013.01); *H04B 1/385* (2013.01); *H04B 2001/3866* (2013.01)

(58) Field of Classification Search
CPC .............. H04M 1/0258; H04M 1/6041; G02B 2027/0178; G02B 27/017; G04R 60/04
USPC ............................ 455/128, 129, 575.2, 575.7
See application file for complete search history.

(56) References Cited

U.S. PATENT DOCUMENTS

| | | |
|---|---|---|
| 6,421,031 B1 | 7/2002 | Ronzani et al. |
| 2009/0073057 A1 | 3/2009 | Cheng et al. |
| 2009/0102727 A1 | 4/2009 | Oh |
| 2010/0040245 A1* | 2/2010 | Buil ......................... H04M 1/05 381/107 |
| 2012/0169990 A1 | 7/2012 | Burnstein |
| 2012/0328134 A1 | 12/2012 | Lewis |
| 2014/0240474 A1 | 8/2014 | Kondo |
| 2015/0181388 A1 | 6/2015 | Smith |

FOREIGN PATENT DOCUMENTS

| | | |
|---|---|---|
| JP | H11-353444 A | 12/1999 |
| JP | 2013-513275 A | 4/2013 |
| JP | 2013-090061 A | 5/2013 |
| WO | 2008/027705 A1 | 3/2008 |

OTHER PUBLICATIONS

The extended European search report issued by the European Patent Office dated Aug. 1, 2017, which corresponds to uropean Patent Application No. 17162308.5-1927 and is related to U.S. Appl. No. 15/465,703.

\* cited by examiner

*Primary Examiner* — Tu X Nguyen

(74) *Attorney, Agent, or Firm* — Studebaker & Brackett PC

(57) ABSTRACT

An electronic device is to be worn by a user and includes an antenna and a storage compartment that stores the antenna. In a state of the electronic device being worn by the user, the storage compartment is positioned at a side of the user's head. The antenna is capable of selectively adopting a stored state and a deployed state, the antenna being stored in the storage compartment in the stored state, and a greater portion of the antenna being separated from the storage compartment in the deployed state than in the stored state.

8 Claims, 10 Drawing Sheets

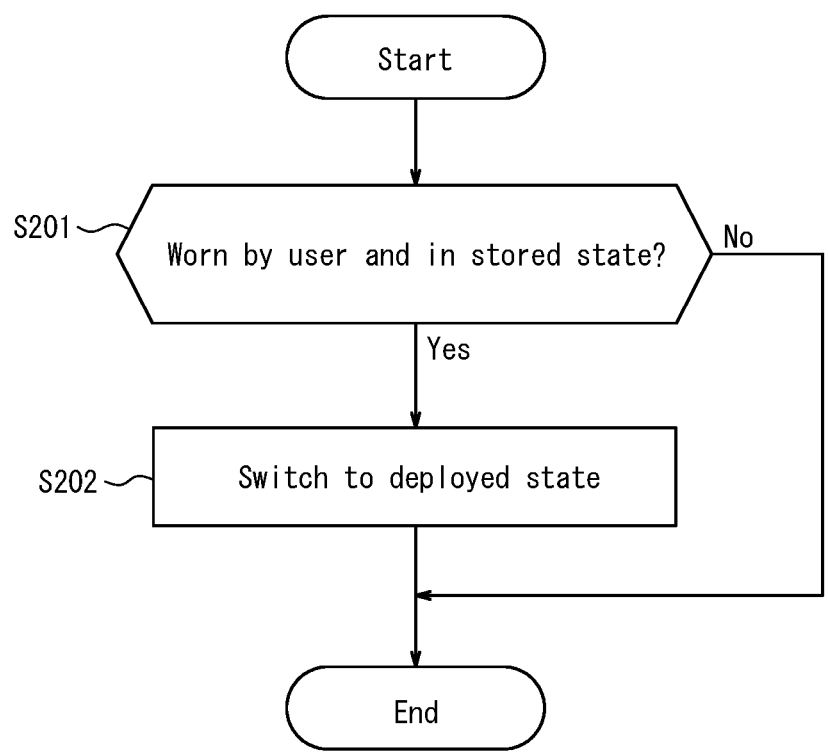

ELECTRONIC DEVICE

CROSS REFERENCE TO RELATED APPLICATIONS

This application claims priority to and the benefit of Japanese Patent Application No. 2016-060472 filed on Mar. 24, 2016, the entire contents of which are incorporated herein by reference.

TECHNICAL FIELD

This disclosure relates to an electronic device.

BACKGROUND

In recent years, wearable terminals that can be used by being worn on the user's body have become more widespread. As examples of wearable terminals, JP 2013-90061 A (PTL 1), JP H11-353444 A (PTL 2), and JP 2013-513275 A (PTL 3) disclose electronic devices.

CITATION LIST

Patent Literature

PTL 1: JP 2013-90061 A
PTL 2: JP H11-353444 A
PTL 3: JP 2013-513275 A

SUMMARY

Wireless communication devices that are worn on the user's body need to have a Specific Absorption Rate (SAR) equal to or less than a certain threshold. In the electronic devices disclosed in PTL 1 to 3, however, the antenna of the wireless communication device that transmits and receives radio waves is in close contact with the user's head. Therefore, it is easy for the SAR to increase.

Therefore, it would be helpful to provide an electronic device that can reduce the SAR.

To this end, an electronic device according to one of the embodiments of this disclosure is an electronic device to be worn by a user, the electronic device including an antenna; and a storage compartment configured to store the antenna; such that in a state of the electronic device being worn by the user, the storage compartment is positioned at a side of a head of the user, and such that the antenna is capable of selectively adopting a stored state and a deployed state, the antenna being stored in the storage compartment in the stored state, and a greater portion of the antenna being separated from the storage compartment in the deployed state than in the stored state.

BRIEF DESCRIPTION OF THE DRAWINGS

In the accompanying drawings:
FIG. 4A is a partially expanded view and FIG. 4B is an expanded schematic view of the feed terminal;
FIG. 11 is a flowchart illustrating processing by the electronic device in FIG. 10.

DETAILED DESCRIPTION

Embodiment 1
The following describes Embodiment 1 of an electronic device according to this disclosure with reference to the drawings.

Figure 1:
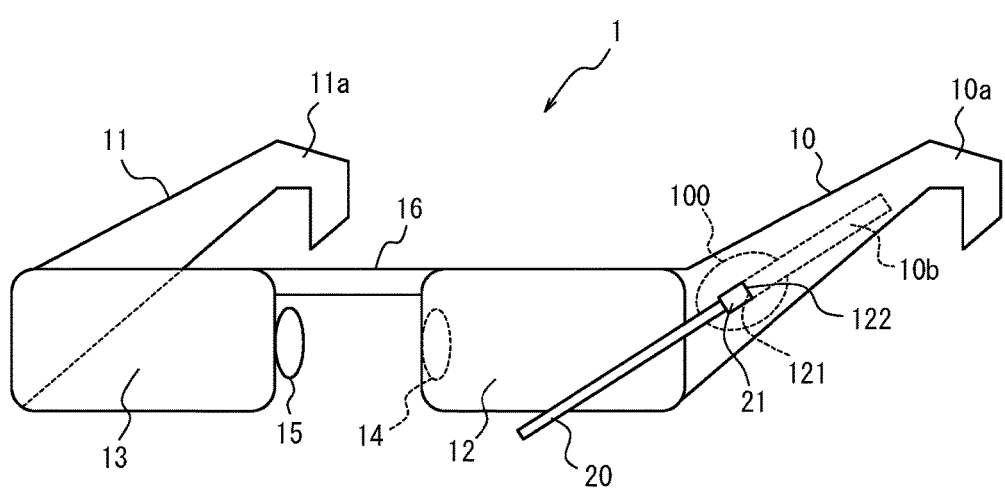
FIG. 1 is a perspective view schematically illustrating the structure of an electronic device according to Embodiment 1.

As illustrated in FIG. 1, the electronic device 1 includes temples 10 and 11, lenses 12 and 13, nose pads 14 and 15, a bridge 16, an antenna 20, and circuitry 100.

The temple 10 is positioned on the left side of the user's head when the user is wearing the electronic device 1 (state of wearing by the user). The temple 11 is positioned on the right side of the user's head in the state of wearing by the user.

The temple 10 has an earpiece 10a at one edge thereof. The temple 11 also has an earpiece 11a at one edge thereof.

The earpiece 10a rests on the user's left ear in the state of wearing by the user. The earpiece 11a rests on the user's right ear in the state of wearing by the user.

The temple 10 is connected at the other edge to the lens 12. Also, the temple 11 is connected at the other edge to the lens 13. The temple 10 includes a storage compartment 10b capable of storing the antenna 20. The storage compartment 10b includes a feeder 121 extending from the circuitry 100 at one end of the storage compartment 10b.

The lens 12 is connected to the temple 10 at one edge and to the bridge 16 at the other edge. The lens 13 is connected to the temple 11 at one edge and to the bridge 16 at the other edge. The lens 12 is positioned in front of the user's left eye in the state of wearing by the user. The lens 13 is positioned in front of the user's right eye in the state of wearing by the user.

The nose pad 14 is provided on the bridge 16 side of the lens 12. The nose pad 15 is provided on the bridge 16 side of the lens 13. In the state of wearing by the user, the nose pad 14 abuts the left side of the user's nose. In the state of wearing by the user, the nose pad 15 abuts the right side of the user's nose.

The bridge 16 maintains the left and right lenses 12 and 13 in a predetermined positional relationship by connecting the lenses 12 and 13.

The antenna 20 is a rod-shaped antenna having a feed terminal 21 at one end. The antenna 20 is capable of selectively adopting a stored state and a deployed state, the antenna 20 being stored in the storage compartment 10b of the temple 10 in the stored state, and a greater portion of the antenna 20 being separated from the storage compartment 10b in the deployed state than in the stored state. FIG. 1 illustrates the deployed state. In the deployed state, by the feed terminal 21 connecting to the feeder 121, the antenna 20 functions as a monopole antenna having a feeding point 122 at the feed terminal 21.

The circuitry 100 feeds power to the antenna 20 via the feeder 121 that extends from the circuitry 100. FIG. 1 illustrates an example of providing the circuitry 100 inside of the temple 10, but the circuitry 100 may be provided at any position in the electronic device 1.

Figure 2:
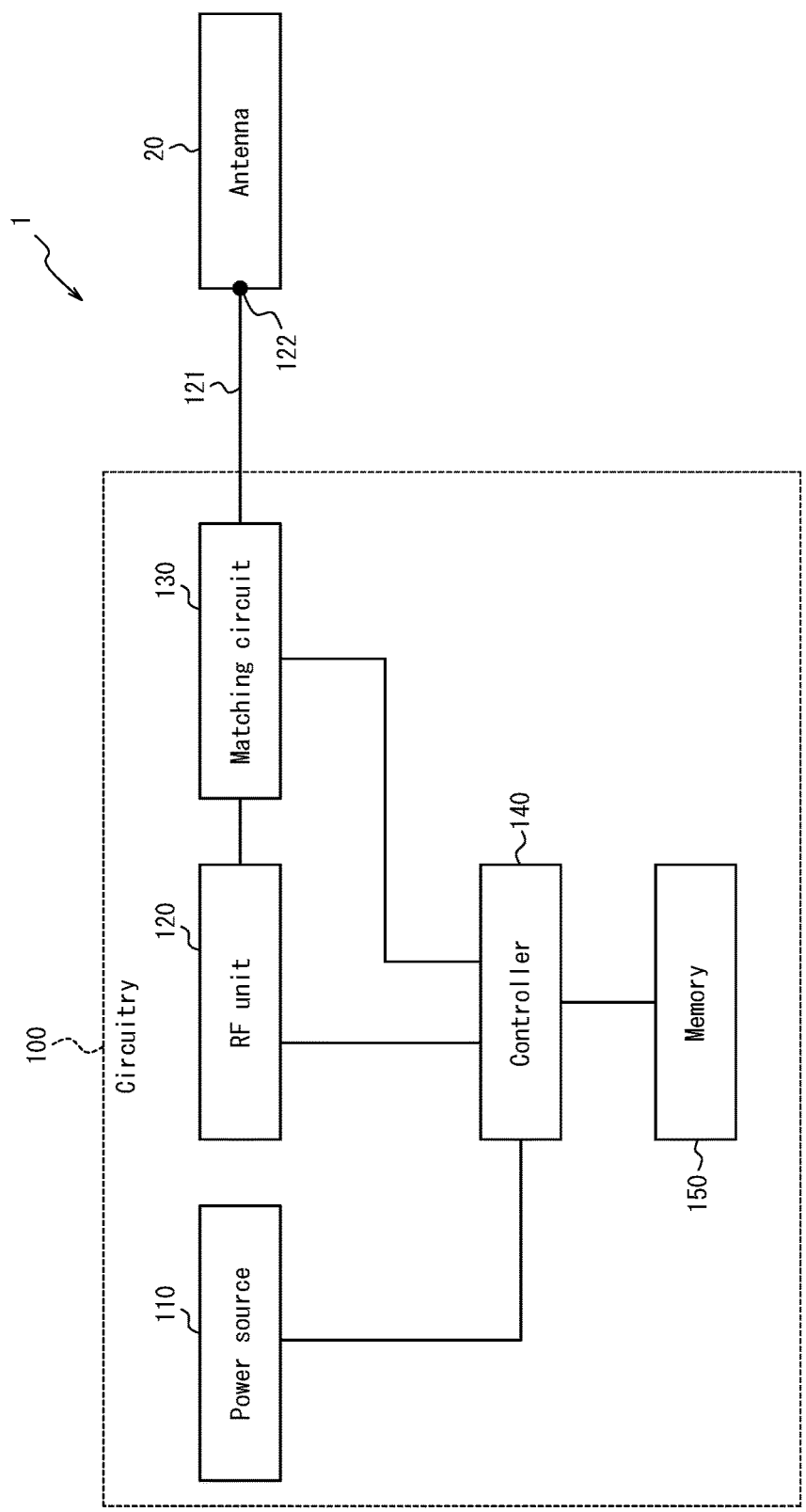
FIG. 2 is a block diagram illustrating the internal configuration of the electronic device in FIG. 1.

Next, with reference to FIG. 2, the internal configuration of the electronic device 1 illustrated in FIG. 1 is described.

As illustrated in FIG. 2, the antenna 20 is connected to the circuitry 100. The circuitry 100 includes a power source 110, an RF unit 120, a matching circuit 130, a controller 140, and a memory 150.

The power source 110 for example includes a battery. In the example illustrated in FIG. 2, in order to simplify the drawing, an example is shown of only the power source 110 and controller 140 being connected, but the power source 110 actually provides power to each member in the electronic device 1, such as the RF unit 120, the controller 140, and the memory 150.

The RF unit 120 outputs a signal to the antenna 20 via the matching circuit 130 and the feeder 121 and receives a signal from the antenna 20. The RF unit 120 modulates the signal of a predetermined frequency received from the controller 140 to a higher frequency and outputs the result to the matching circuit 130. The RF unit 120 also demodulates the signal of a predetermined frequency received from the matching circuit 130 to a lower frequency and outputs the result to the controller 140.

Based on control by the controller 140, the matching circuit 130 adjusts the impedance so as to reduce the energy loss between the RF unit 120 and the antenna 20. The impedance within the matching circuit 130 need not be adjustable by a control signal from the controller 140 and may be fixed.

The controller 140 may, for example, be configured by a microcomputer having a non-volatile memory area and a processor that executes a control program stored in the memory area.

The memory 150 can be configured by a semiconductor memory, a magnetic memory, or the like. The memory 150 stores programs, data, and the like used in processing executed by the controller 140.

With this configuration, the electronic device 1 according to this embodiment is capable of selectively adopting a stored state and a deployed state, the antenna 20 being stored in the storage compartment 10b in the stored state and the antenna 20 being caused to function as an antenna in the deployed state, with a larger portion of the antenna 20 being separated from the storage compartment 10b. Accordingly, for example adopting the deployed state in the state of wearing by the user allows the antenna 20 to be separated from the user's head and reduces the SAR. Conversely, adopting the stored state when the user is not wearing the electronic device 1 ensures portability. Since a larger portion of the antenna 20 can be separated from the user's head, interference with radio propagation by the user's head can be reduced, improving radio performance.

Details on the stored state and the deployed state of the antenna 20 in the electronic device 1 are now provided with examples for each embodiment of the antenna 20.

Figure 3:
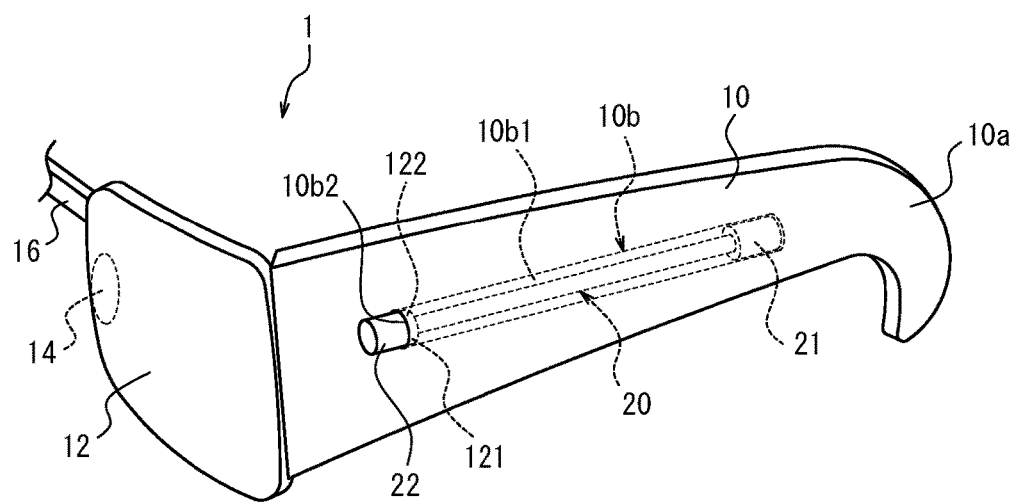
FIG. 3 is a partially expanded view illustrating the stored state of the electronic device in FIG. 1.
Figure 4A:
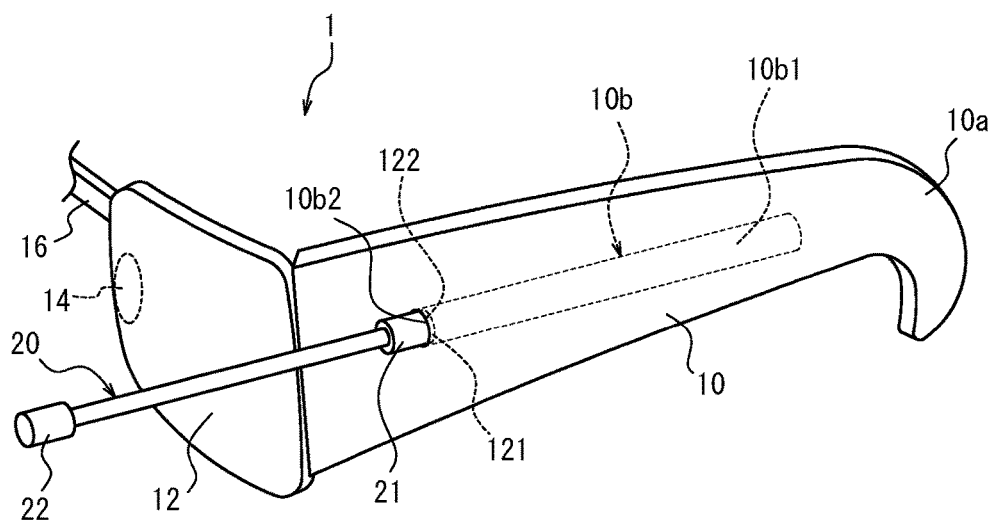
FIGS. 4A and 4B illustrate the deployed state of the electronic device in FIG. 3, where

The circuitry 100 is omitted from FIGS. 3 and 4A for simplicity. Similarly, in FIGS. 5 to 7, the circuitry 100 is omitted. The electronic device 1 of this embodiment is capable of switching between the stored state and the deployed state by the antenna 20 moving while sliding in the longitudinal direction of the storage compartment 10b.

In this example, the storage compartment 10b includes a hollow portion 10b1 that is provided inside the temple 10 and extends in the longitudinal direction of the temple 10 and an opening 10b2 provided at the surface of the temple 10 on the lens 12 side thereof. The feeder 121 that extends from the circuitry 100 is provided at the opening 10b2 of the storage compartment 10b.

The antenna 20 includes a first feed terminal 21 at one end and a second feed terminal 22 at the other end. The antenna 20 is slidable within the hollow portion 10b1 of the storage compartment 10b in the longitudinal direction of the temple 10 and is capable of selectively adopting a stored state of being stored in the storage compartment 10b and a deployed state of being ejected from the storage compartment 10b. In the stored state illustrated in FIG. 3, the second feed terminal 22 is connected to the feeder 121 positioned at the opening 10b2 of the storage compartment 10b. On the other hand, in the deployed state illustrated in FIG. 4A, the first feed terminal 21 is connected to the feeder 121. Accordingly, in the stored state, the antenna 20 functions as a monopole antenna having the feeding point 122 at the second feed terminal 22, and in the deployed state, the antenna 20 functions as a monopole antenna having the feeding point 122 at the first feed terminal 21.

Figure 4B:
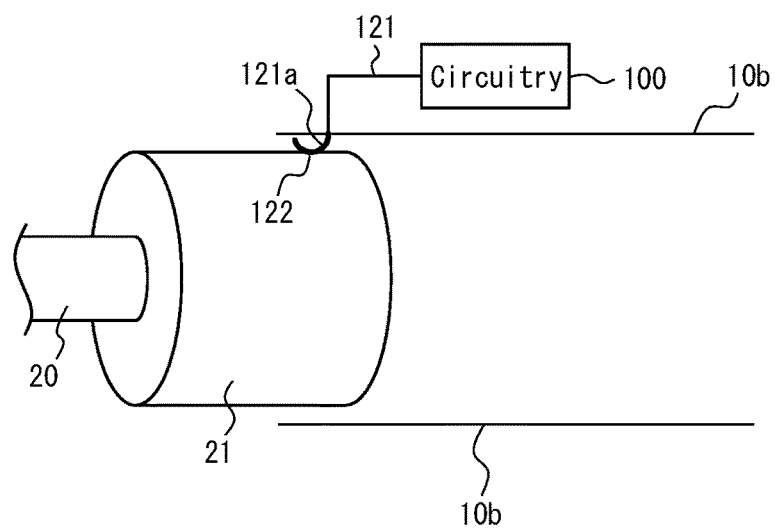

As illustrated in FIG. 4B, the electronic device 1 is configured so that the feed terminal 21 slides through the storage compartment 10b. An elastic, conductive feed pin 121a is formed on the inside of the storage compartment 10b. This feed pin 121a forms a portion of the feeder 121 extending from the circuitry 100.

When the antenna 20 is in the deployed state, the feed pin 121a contacts the feed terminal 21 and conducts electricity. The portion at which the feed pin 121a contacts the feed terminal 21 becomes the feeding point 122. When the antenna 20 is in the stored state, the feed pin 121a contacts the feed terminal 22 and conducts electricity. The portion at which the feed pin 121a contacts the feed terminal 22 becomes the feeding point 122.

By adopting such a configuration, the electronic device 1 according to this embodiment can adopt the deployed state by sliding the antenna 20 towards the front of the user's head. Therefore, the antenna 20 can be separated from the user's head, and the SAR can be reduced. Also, in the electronic device 1 according to this embodiment, since a larger portion of the antenna 20 can be separated from the user's head, interference with radio propagation by the user's head can be reduced, improving radio performance.

Embodiment 2

Figure 5:
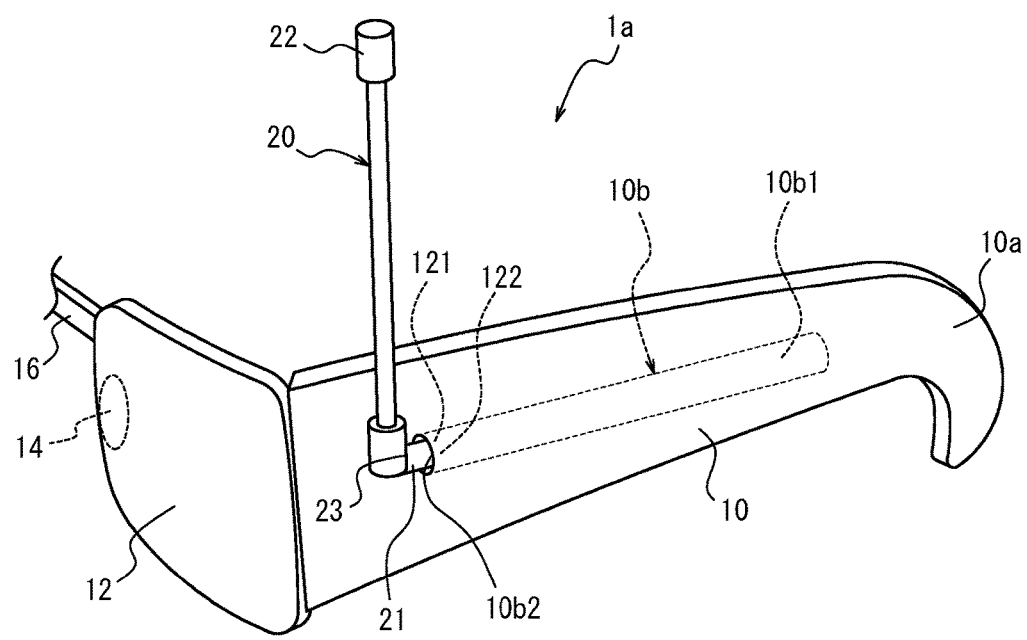
FIG. 5 is a partially expanded view illustrating the deployed state of the electronic device in Embodiment 2.

Next, Embodiment 2 of an electronic device according to this disclosure is described with reference to FIG. 5. In an electronic device 1a of Embodiment 2, the antenna 20 further includes a rotating mechanism 23 at the end where the first feed terminal 21 is included. The remaining internal configuration, structure, and the like of Embodiment 2 are similar to those of the above-described Embodiment 1. Therefore, the following describes the differences from Embodiment 1.

The rotating mechanism 23 is, for example, configured by a hinge. The rotating mechanism 23 is ejected outside of the opening 10b2 in the deployed state illustrated in FIG. 5. As a result, the antenna 20 can rotate about the rotating mechanism 23 in the deployed state. Here, the rotating mechanism 23 may be configured as a member integral with the first feed terminal 21 as illustrated in FIG. 5 or may be configured as a member separate from the first feed terminal 21.

By adopting such a configuration, the electronic device 1a of Embodiment 2 achieves similar effects to those of the above-described Embodiment 1. Also, the antenna 20 can be further rotated in the deployed state, thereby allowing the antenna 20 to be adjusted in a direction that does not obstruct the user's field of vision.

Embodiment 3

Figure 6:
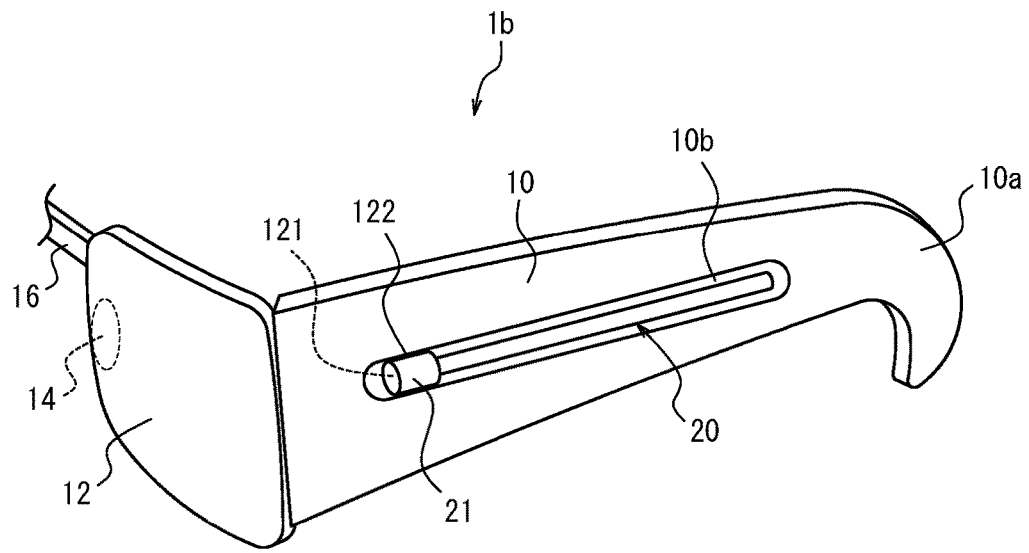
FIG. 6 is a partially expanded view illustrating the stored state of the electronic device in Embodiment 3.
Figure 7:
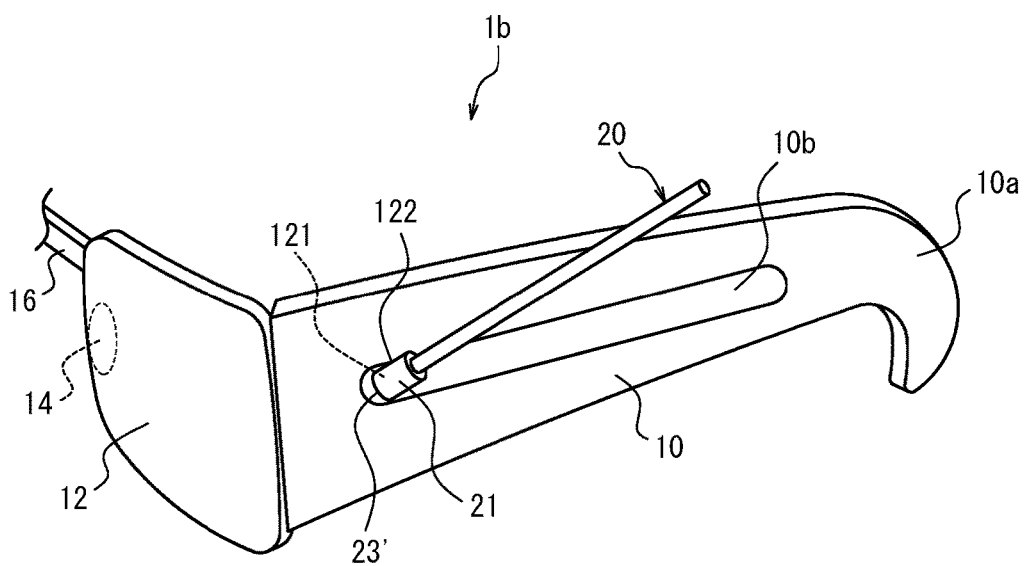
FIG. 7 is a partially expanded view illustrating the deployed state of the electronic device in FIG. 6.

Next, Embodiment 3 of an electronic device according to this disclosure is described with reference to FIGS. 6 and 7. The remaining internal configuration, structure, and the like of Embodiment 3 are similar to those of the above-described Embodiment 1. Therefore, the following describes the differences from Embodiment 1.

The electronic device 1b of this embodiment is capable of switching between the stored state and the deployed state by the antenna 20 rotating at the position of the feed terminal 21.

In Embodiment 3, the storage compartment 10b is formed as a groove provided in the longitudinal direction at the side of the temple 10. The antenna 20 further includes a rotating mechanism 23' at the end where the feed terminal 21 is included.

The rotating mechanism 23' is, for example, configured by a hinge. This rotating mechanism 23' may be a hinge having two or more axes instead of a hinge having only one axis. In the case of a hinge having two or more axes, the tip of the antenna 20 can point in a direction over a wider range than in the case of a hinge having one axis. The rotating mechanism 23' may be a mechanism composed of a bulb-shaped base portion formed at the base of the antenna 20 and a case that covers the base portion, with the antenna 20 rotating by the bulb-shaped base portion rotating within the case.

By rotating about the rotating mechanism 23', the antenna 20 can switch between the stored state and the deployed state. In the stored state, the antenna 20 is stored in the storage compartment 10b in the longitudinal direction of the temple 10 by being folded via the rotating mechanism 23'. Conversely, in the deployed state, the antenna 20 is pointed in a different direction than in the stored state by rotating via the rotating mechanism 23'. The feed terminal 21 is configured to connect to the feeder 121 in both the stored state and the deployed state.

By adopting such a configuration, the electronic device 1b of Embodiment 3 achieves similar effects to those of the above-described Embodiment 1. Also, in the deployed state, the antenna 20 can be pointed in a different direction than in the stored state by rotating via the rotating mechanism 23', thereby separating the antenna 20 from the user's head and reducing the SAR.

Embodiment 4

Figure 8:
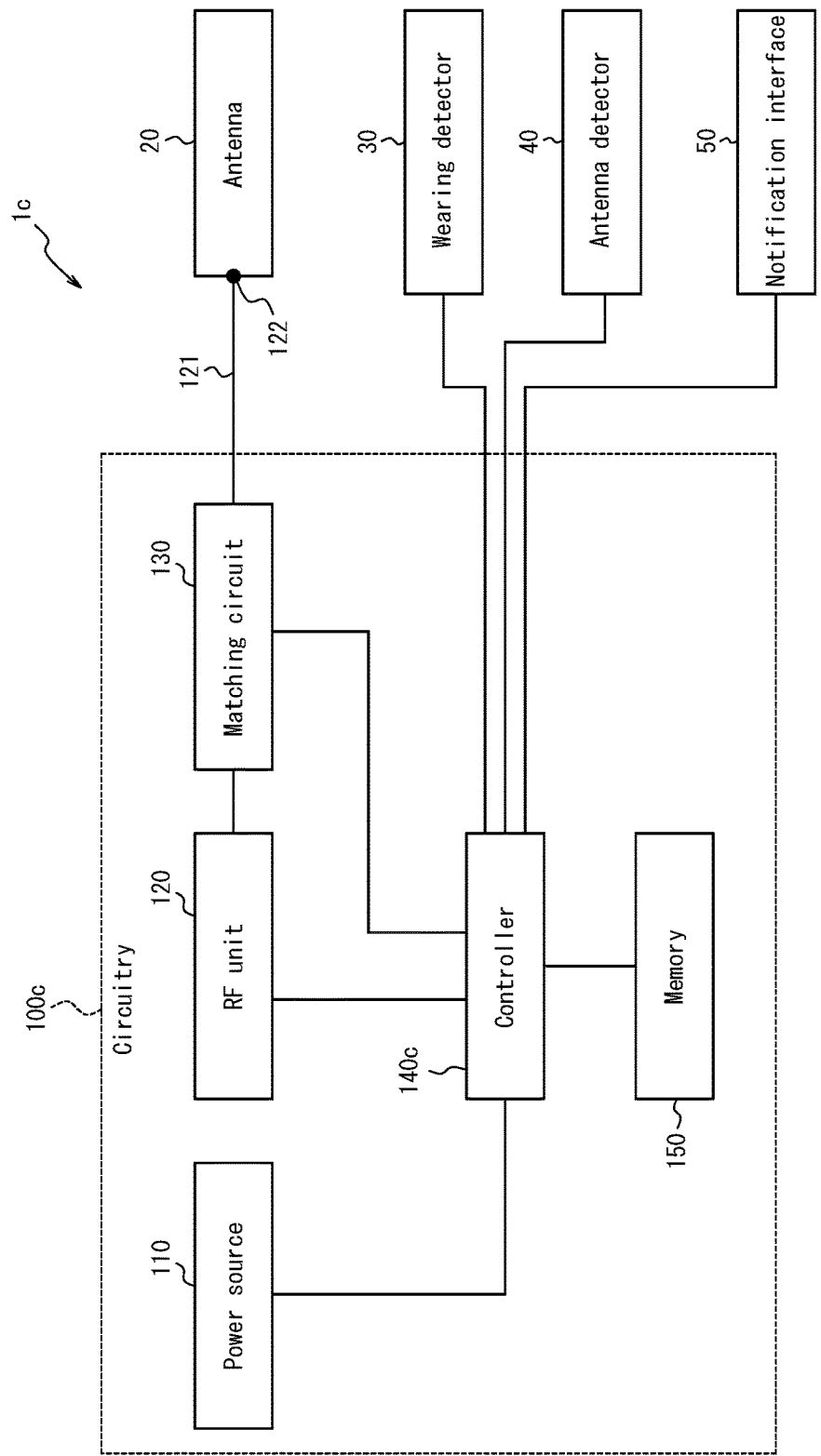
FIG. 8 is a block diagram illustrating the internal configuration of the electronic device in Embodiment 4.

Next, an electronic device 1c in Embodiment 4 of an electronic device according to this disclosure is described with reference to FIG. 8. In addition to the structure of the electronic device 1 according to Embodiment 1, the electronic device 1c of Embodiment 4 includes a wearing detector 30, an antenna detector 40, and a notification interface 50, as illustrated in FIG. 8. Circuitry 100c includes a power source 110, an RF unit 120, a matching circuit 130, a controller 140c, and a memory 150. In this embodiment, the same reference numbers are assigned to members that have the same functions and perform the same operations as in Embodiment 1. Therefore, the following describes the members having a structure and effects that differ from Embodiment 1.

The wearing detector 30 is a device that detects whether the user is wearing the electronic device 1c. The wearing detector 30 may, for example, be configured by an electrode of a proximity sensor or a touch sensor provided in the nose pad 14 or 15 or the earpiece 10a or 11a. The wearing detector 30 detects proximity to or contact with the user's face as the state of wearing by the user.

The antenna detector 40 is a device that detects whether the antenna 20 is in the stored state. The antenna detector 40 may, for example, be configured by a sensor or the like that detects that the antenna 20 is in the stored state. For example, an electric switch may be used as the sensor used in this antenna detector 40. Alternatively, a magnetic sensor or the like may be used as the sensor used in this antenna detector 40.

The notification interface 50 is a device that notifies the user of information. For example, the notification interface 50 may be a display apparatus, such as a liquid crystal display apparatus, embedded in the lenses 12 and 13. An appropriate combination of the following may also be used as the notification interface 50: a projector that generates a virtual image visible to the user through the lenses 12 and 13, a speaker that outputs audio, a vibration apparatus that vibrates the electronic device 1c, and the like.

The controller 140c acquires the results of detection by the wearing detector 30 and the antenna detector 40 and controls operation of the RF unit 120 and the notification interface 50 based on these results of detection. The controller 140c may, for example, be configured by a microcomputer having a non-volatile memory area and a processor that executes a control program stored in the memory area.

Figure 9:
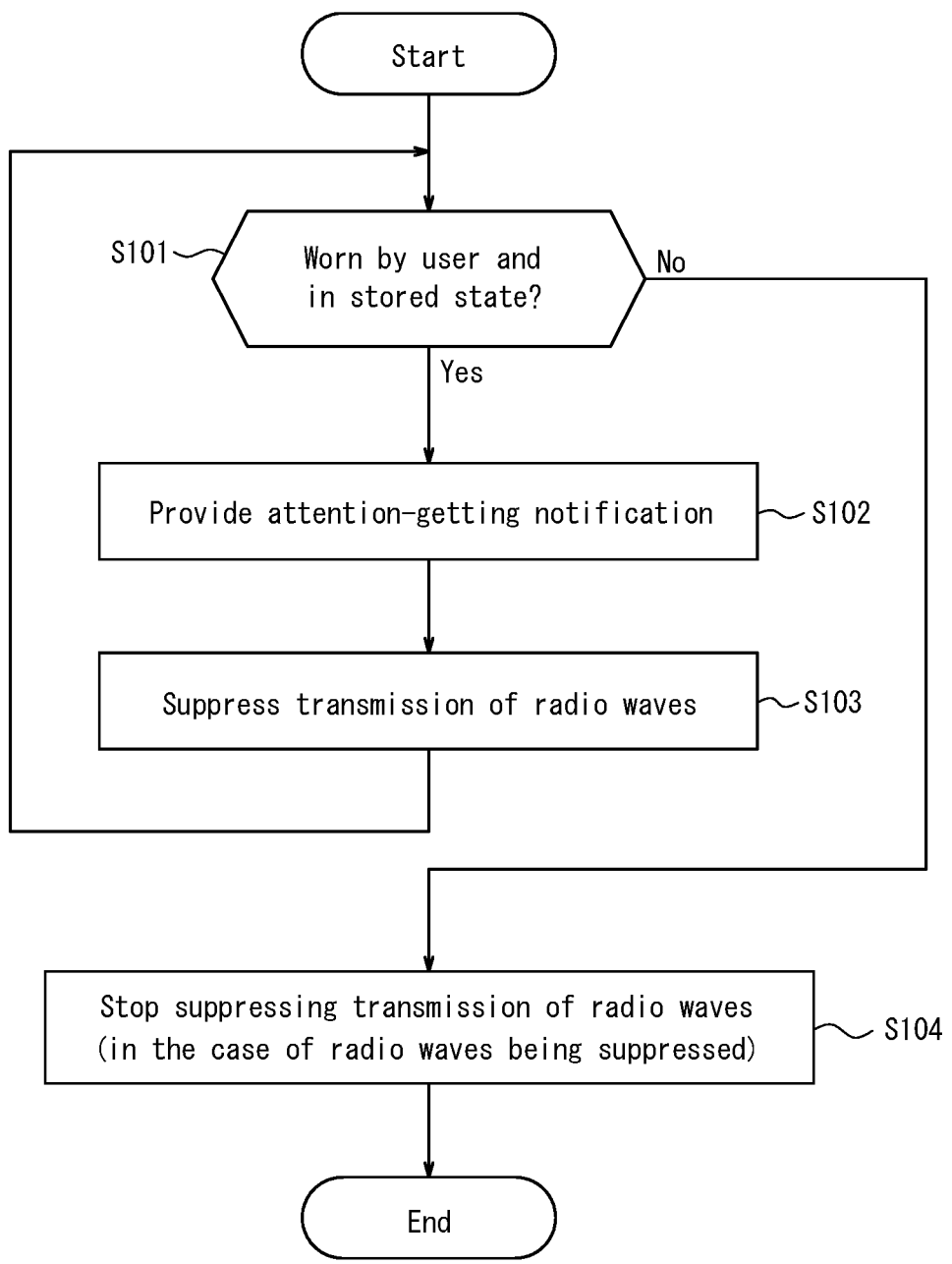
FIG. 9 is a flowchart illustrating processing by the electronic device in FIG. 8.

With reference to the flowchart in FIG. 9, the following describes processing executed by the controller 140c of the electronic device 1c according to this embodiment.

Upon the wearing detector 30 detecting that the user is wearing the electronic device 1c and the antenna detector 40 detecting that the antenna 20 is in the stored state (step S101: Yes), the controller 140c proceeds to the processing of step S102. Conversely, when the wearing detector 30 does not detect that the user is wearing the electronic device 1c, or the antenna detector 40 detects that the antenna 20 is in the deployed state (step S101: No), the controller 140c terminates the processing.

In the processing in step S102, the controller 140c notifies the user of attention-getting information via the notification interface 50. The attention-getting information is information to encourage the user to place the antenna 20 in the deployed state. For example, when the notification interface 50 is a display apparatus incorporated into the lenses 12 and 13, the attention-getting information includes the case of displaying attention-getting character data on the screen with a pop-up display.

Upon the wearing detector 30 detecting that the user is wearing the electronic device 1c and the antenna detector 40 detecting that the antenna 20 is in the stored state (step S101: Yes), then in addition to the processing in step S102, the controller 140c may control the RF unit 120 to suppress transmission of radio waves via the antenna 20 (step S103). In this context, suppressing transmission of radio waves for example includes the cases of reducing or suspending the radio wave output level, restricting functions related to radio wave transmission, or the like in order to reduce the SAR.

After the end of processing in step S102 and step S103, the controller 140c returns to the determination processing in step S101. When the wearing detector 30 does not detect that the user is wearing the electronic device 1c, or the antenna detector 40 detects that the antenna 20 is in the deployed state (step S101: No), then the controller 140c stops suppressing transmission of radio waves (step S104) and terminates the processing.

In this way, the electronic device 1c of this embodiment achieves similar effects to those of the above-described Embodiment 1. Also, when the antenna 20 is in the stored state during the state of wearing by the user, then the user is notified of attention-getting information, and transmission of radio waves is suppressed. Therefore, while reducing the SAR, the user can be encouraged to place the antenna 20 in the deployed state, in which the SAR is further reduced.

Embodiment 5

Figure 10:
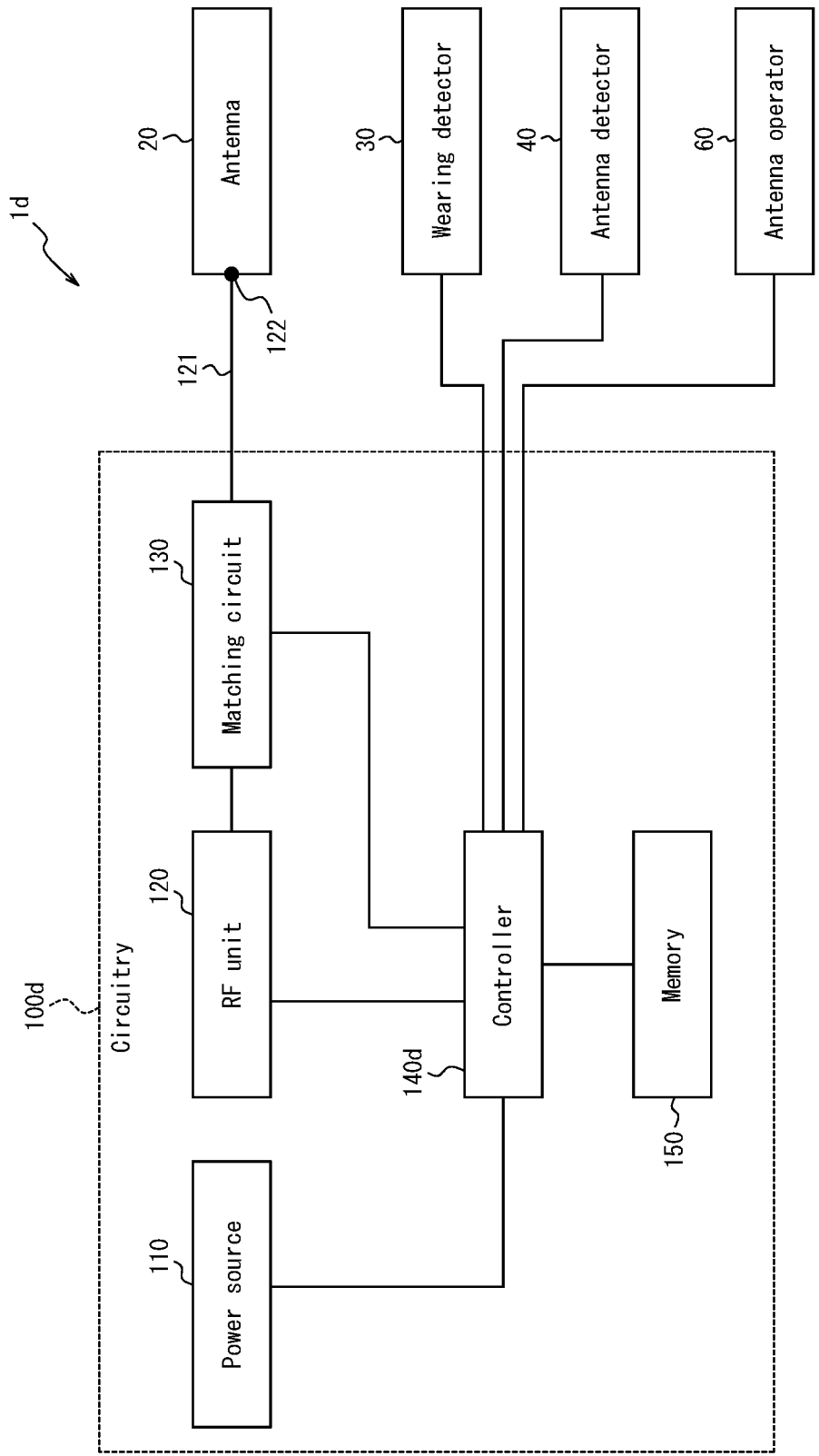
FIG. 10 is a block diagram illustrating the internal configuration of the electronic device in Embodiment 5.

Next, an electronic device 1d in Embodiment 5 of an electronic device according to this disclosure is described with reference to FIG. 10. In addition to the structure of the electronic device 1 according to Embodiment 1, the electronic device 1d of Embodiment 5 includes a wearing detector 30, an antenna detector 40, and an antenna operator 60, as illustrated in FIG. 10. Circuitry 100d includes a power source 110, an RF unit 120, a matching circuit 130, a controller 140d, and a memory 150. In this embodiment, the same reference numbers are assigned to members that have the same functions and perform the same operations as in Embodiment 1. Therefore, the following describes the members having a structure and effects that differ from Embodiment 1. Also, the operations of the wearing detector 30 and the antenna detector 40 illustrated in FIG. 10 are similar to those of the above-described Embodiment 4. Hence, a description thereof is omitted.

As illustrated in FIG. 10, the electronic device 1d of Embodiment 5 of an electronic device according to this disclosure includes the antenna operator 60 instead of the notification interface 50 in the electronic device 1c of the above-described Embodiment 4.

The antenna operator 60 is a device that moves the antenna 20 so that the antenna 20 enters the deployed state. For example, the antenna operator 60 is configured by a spring, a motor, or the like stored in the storage compartment 10b.

With reference to the flowchart in FIG. 11, the following describes processing executed by the controller 140d of the electronic device 1d according to this embodiment.

When the wearing detector 30 detects that the user is wearing the electronic device 1d, and the antenna detector 40 detects that the antenna 20 is in the stored state (step S201: Yes), the controller 140d switches the antenna 20 to the deployed state with the antenna operator 60 (step S202) and terminates the processing. Conversely, when the wearing detector 30 does not detect that the user is wearing the electronic device 1c, or the antenna detector 40 detects that the antenna 20 is in the deployed state (step S201: No), the controller 140d terminates the processing.

In this way, the electronic device 1d of Embodiment 5 achieves similar effects to those of the above-described Embodiment 1. Also, when the antenna 20 is in the stored state during the state of wearing by the user, the antenna 20 is switched to the deployed state, thereby reducing the SAR.

This disclosure has been described based on the drawings and on embodiments, yet it should be noted that a person of ordinary skill in the art could easily make a variety of modifications and adjustments based on the present disclosure. Therefore, such changes and modifications are to be understood as included within the scope of this disclosure. For example, the functions and the like included in the various components and steps may be reordered in any logically consistent way. Furthermore, components or steps may be combined into one or divided.

Examples have been described in which the storage compartment 10b included in the electronic devices of the above embodiments is formed as a hollow portion provided inside the temple 10 or as a groove provided in the longitudinal direction at the side of the temple 10, but the storage compartment 10b is not limited to these examples. It suffices for the storage compartment 10b to be capable of storing the antenna 20 in the longitudinal direction of the storage compartment 10b.

The antenna 20 included in the electronic devices of the above embodiments has been described as a monopole antenna configured to be storable in the storage compartment 10b, but the antenna 20 may be a monopole antenna configured to be storable in a storage compartment provided in the temple 11. The antenna 20 may also be a dipole antenna configured to be storable respectively in the storage compartment 10b and a storage compartment provided in the temple 11.

The circuitry provided in the electronic devices of the above embodiments has been described as being provided at any position in the electronic devices, but the circuitry may instead be provided in a housing separate from the electronic devices and capable of wired or wireless communication.

The opening 10b2 of the storage compartment 10b provided in the electronic devices of the above embodiments has been described as provided at the surface of the temple 10 on the lens 12 side thereof, but the opening 10b2 may be provided at the surface of the temple 10 on the earpiece 10a side thereof.

Furthermore, the antenna 20 provided in the electronic devices of the above embodiments may be an antenna that can be elongated as a whole by combining a plurality of tubular antennas with different diameters. In this case, by matching the longitudinal length of the storage compartment 10b to the length of the antenna 20 when contracted, the storage compartment 10b can be made more compact.

Also, the structure of the electronic devices in the above embodiments can be combined freely.

The invention claimed is:

1. An electronic device to be worn by a user, the electronic device comprising:
   an antenna; and
   a storage compartment configured to store the antenna;
   wherein in a state of the electronic device being worn by the user, the storage compartment is positioned at a side of a head of the user;
   wherein the antenna is capable of selectively adopting a stored state and a deployed state, the antenna being stored in the storage compartment in the stored state, and a greater portion of the antenna being separated from the storage compartment in the deployed state than in the stored state;
   wherein the antenna comprises a first feed terminal and a second feed terminal;
   wherein the storage compartment comprises a feeder; and
   wherein the first feed terminal is connected to the feeder in the stored state, and the second feed terminal is connected to the feeder in the deployed state.

2. The electronic device of claim 1,
   wherein the first feed terminal is at one end of the antenna; and
   wherein the second feed terminal is at another end of the antenna.

3. The electronic device of claim 1, wherein the antenna is movable along a longitudinal direction of the storage compartment.

4. The electronic device of claim 1, wherein the antenna includes a rotating mechanism and is capable of rotating about the rotating mechanism in the deployed state.

5. The electronic device of claim 1, wherein the antenna includes a rotating mechanism and is capable of switching between the stored state and the deployed state by rotating about the rotating mechanism.

6. An electronic device to be worn by a user, the electronic device comprising:
- an antenna;
- a storage compartment configured to store the antenna;
- a wearing detector configured to detect whether the user is wearing the electronic device;
- an antenna detector configured to detect whether the antenna is in the stored state;
- a notification interface; and
- a controller configured to cause the notification interface to provide notification when the wearing detector detects that the user is wearing the electronic device and the antenna detector detects that the antenna is in the stored state;
- wherein in a state of the electronic device being worn by the user, the storage compartment is positioned at a side of a head of the user; and
- wherein the antenna is capable of selectively adopting a stored state and a deployed state, the antenna being stored in the storage compartment in the stored state, and a greater portion of the antenna being separated from the storage compartment in the deployed state than in the stored state.

7. The electronic device of claim 6, wherein the controller suppresses transmission of radio waves via the antenna while the wearing detector detects that the user is wearing the electronic device and the antenna detector detects that the antenna is in the stored state.

8. An electronic device to be worn by a user, the electronic device comprising:
- an antenna;
- a storage compartment configured to store the antenna;
- a wearing detector configured to detect whether the user is wearing the electronic device;
- an antenna detector configured to detect whether the antenna is in the stored state;
- an antenna operator configured to move the antenna so that the antenna enters the deployed state; and
- a controller configured to switch the antenna to the deployed state by moving the antenna with the antenna operator when the wearing detector detects that the user is wearing the electronic device and the antenna detector detects that the antenna is in the stored state;
- wherein in a state of the electronic device being worn by the user, the storage compartment is positioned at a side of a head of the user; and
- wherein the antenna is capable of selectively adopting a stored state and a deployed state, the antenna being stored in the storage compartment in the stored state, and a greater portion of the antenna being separated from the storage compartment in the deployed state than in the stored state.

* * * * *